UNITED STATES PATENT OFFICE.

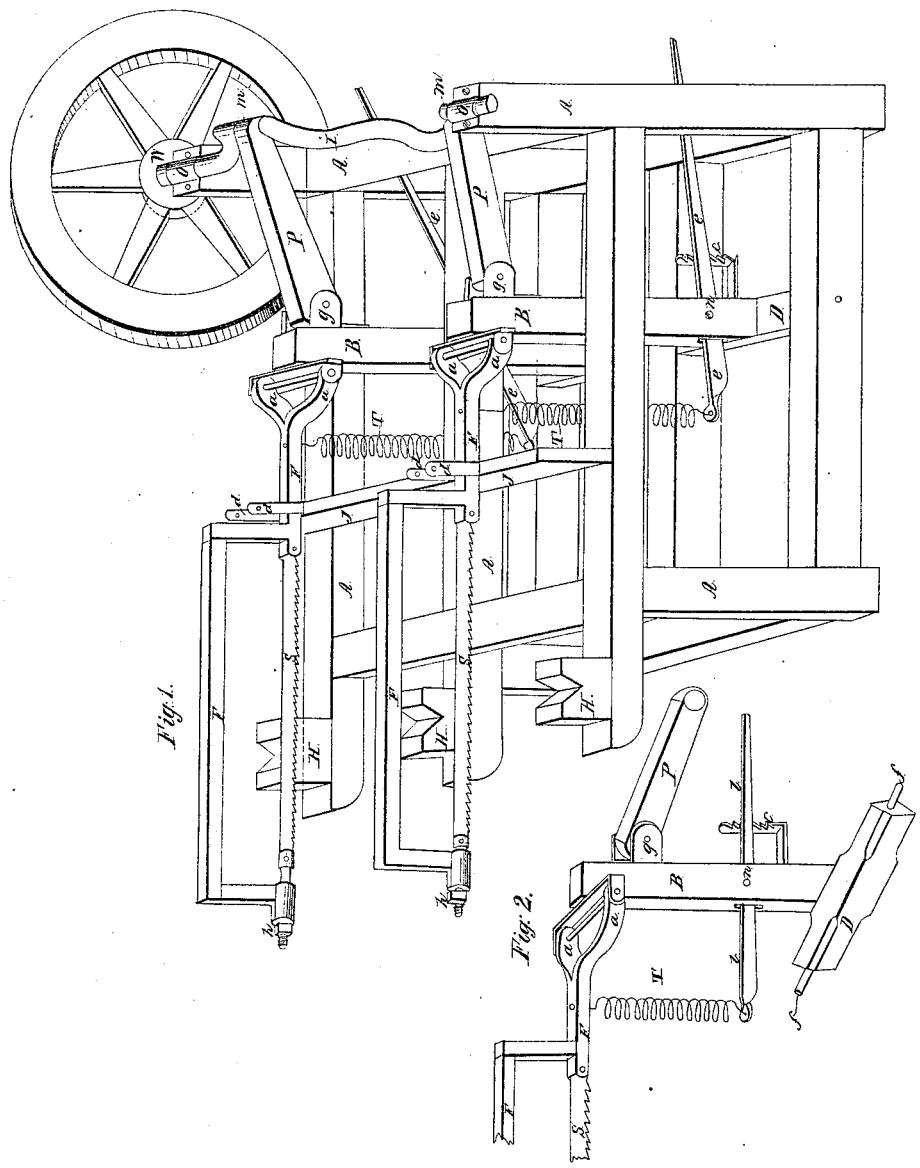

ADRIAN V. B. ORR, OF LANCASTER, PENNSYLVANIA.

SAWING-MACHINE.

Specification of Letters Patent No. 26,047, dated November 8, 1859.

*To all whom it may concern:*

Be it known that I, ADRIAN V. B. ORR, of the city of Lancaster, in the county of Lancaster and State of Pennsylvania, have invented a new and Improved Machine for Crosscut-Sawing Fire-Wood; and I do hereby declare that the following is a full and exact description thereof, reference being had to the accompanying drawings and to the letters of reference marked thereon.

The nature of my invention consists first, in combining the alternate action of two saws, so as to divide a cord wood stick in three pieces in the time, and with less power than is used at present to divide it into two; and in the second place in so arranging the attachments of those saws by means of bifurcated extremities, to oscillating levers, as to do away with the necessity for guides and make them self feeding.

To enable others skilled in the art to make and use my invention, I will proceed to describe its construction and operation.

Figure 1 of the accompanying drawings represents a perspective view of my invention; Fig. 2, a perspective of one saw showing its connections with the oscillating lever, the spring for feeding as well as the lever by which the feed is regulated.

The same letters in both figures refer to like parts.

A, A, A, &c., represent a suitably constructed frame in which the different parts are arranged; H, H, H, the horse or portion of the frame upon which the piece to be sawed is placed; D, the lower piece of the oscillating lever which vibrates on the pivots $f, f$. Into this lower piece D, is inserted the upright portion B, of the oscillating lever, and to one side of its upper end is attached at $g$, the pitman P, while to the other side of this lever B, the bifurcated end $a, a$, of the saw frame F, is arranged by a joint which admits perpendicular motion in the free end of the saw frame but prevents lateral action. The object of this arrangement is to simplify the construction, allowing the saw to run regularly and smoothly without the use of the usual guides. Attached to one end of the frame F near its bifurcation is a spiral spring T. The other end of this spring is fastened to the lever $l, l$, which passes through the perpendicular portion B, of the oscillating lever, and moves on a pivot at $n$. This lever $l, l$, is kept in its place by means of the ratchet $c$, also attached to the oscillating lever B; by means of this arrangement any desired amount of pressure, and consequently feed, can be given to the saw while in motion; as the whole arrangement moves together. Placed across the frame A, A, under the saw frames F, is a piece J, J, having upright portions at $d, d, d, d$, attached to it, between which the saw frame plays. These upright pieces are designed to hold up the saws out of the way while the wood is being placed on the horse H, by placing a pin in their holes under the saw frame when raised. A crank shaft I, having two cranks $m, m$, one on either side and directly opposite is placed in the frame A, A, and secured in its place by means of caps O, O. On one end of this shaft is placed the fly wheel W, to equalize the motions, and to the cranks $m, m$, of this shaft are attached the pitmen P, P, of the oscillating levers B, B, giving to the saws thus arranged, an alternate action on the log, or in other words one saw cutting while the other is coming back, making two cuts through the piece in the time and with the power (plus the friction of an empty saw) required to make one by the ordinary methods.

From the foregoing description of my invention it will be observed that when the crank shaft I is put in motion an alternate action already described will be given to the saws, while passing through the piece on the horse H, H. After having made their cut, they are raised and kept out of the way by a pin in the upright $d, d$, of the cross-piece J, while another log is placed on the horse H, the lever $l, l$, through the spring T, regulating the feed to suit the desire of the operator.

I am aware that various devices have been adopted for sawing fire wood; I therefore make no claim to novelty independently of my mechanical arrangement; but What I do claim as my invention, and wish to secure by Letters Patent, is, The oscillating lever D, B, in combination with the spring T, and feed lever $l, l$, when constructed as described, and operating with either a single saw; or a pair of saws as specified.

ADRIAN V. B. ORR.

Witnesses:
WM. KIRKPATRICK,
E. KIRKPATRICK.